United States Patent [19]
Heeb et al.

[11] Patent Number: 5,574,923
[45] Date of Patent: Nov. 12, 1996

[54] METHOD AND APPARATUS FOR PERFORMING BI-ENDIAN BYTE AND SHORT ACCESSES IN A SINGLE-ENDIAN MICROPROCESSOR

[75] Inventors: Jay Heeb, Gilbert, Ariz.; Sunil Shenoy, Portland; Scott Huck, Beaverton, both of Oreg.

[73] Assignee: Intel Corporation, Santa Clara, Calif.

[21] Appl. No.: 59,543

[22] Filed: May 10, 1993

[51] Int. Cl.$^6$ .......................... G06F 13/38; G06F 12/04; G06F 7/00
[52] U.S. Cl. ............... 395/800; 395/885; 370/99; 364/259.8; 364/239.3; 364/256.8; 364/260.3; 364/260.4; 364/961.3
[58] Field of Search ............ 364/239.3, 256.8, 364/260.3, 260.5, 260.9, 961.3, 259.8, 939.2; 370/43, 99; 395/885, 894

[56] References Cited

U.S. PATENT DOCUMENTS

| | | | |
|---|---|---|---|
| 4,792,897 | 12/1988 | Gotou et al. | 364/200 |
| 4,931,925 | 6/1990 | Utsumi et al. | 364/200 |
| 4,956,809 | 9/1990 | George et al. | 364/900 |
| 4,959,779 | 9/1990 | Weber et al. | 364/200 |
| 4,977,497 | 12/1990 | Sakamura et al. | 364/259.8 |
| 5,107,415 | 4/1992 | Sato et al. | 395/800 |
| 5,113,506 | 5/1992 | Moussouris et al. | 395/400 |
| 5,265,237 | 11/1993 | Tobias et al. | 395/800 |
| 5,408,664 | 4/1995 | Zarrin et al. | 395/700 |
| 5,446,865 | 8/1995 | Corcoran et al. | 364/239.3 |

OTHER PUBLICATIONS

Duncan, R.; "Arithmetic routines for your computer programs, part 2"; PC Magazine; v8 n20 p. 345(5). Nov. 28, 1989.

Cohen, D.; "On Holy Wars and a Plea for Peace"; Computer; IEEE Computer Society; v14 n10 p. 48(7). Oct. 1981.

James, D.; "Multiplexed buses: the endian wars continue"; IEEE Micro; v10 n3 pp. 9–21. Jun. 1990.

Kirrmann, H.; "Data Format and Bus Compatibility in Microprocessors"; IEEE Micro; v3 n4 pp. 32–47. Aug. 1983.

*Primary Examiner*—Larry D. Donaghue
*Assistant Examiner*—Mark H. Rinehart
*Attorney, Agent, or Firm*—Blakely, Sokoloff, Taylor & Zafman

[57] ABSTRACT

A method and apparatus for performing bi-endian byte and short accesses in a single endian microprocessor. The present invention is used in a microprocessor or in a microprocessor in a computer system. The present invention provides a single endian microprocessor that promotes sub-word accesses to word accesses with a means for manipulating the two least significant bits of the access address to point to the correct sub-word data returned during an access to bi-endian external memory. The method for manipulating the address bits is also used to allow a single endian data cache to operate with the bi-endian external memory. The two LSBs of the address are manipulated such that the pointer values are A1# and A0# for word promoted byte accesses or cacheable accesses. For word promoted short accesses or cacheable accesses, the pointer values are A1# and A0. The present invention offers increased flexibility in interfacing a single-endian microprocessor with bi-endian systems. The present invention provides easy interfacing without undue or overly complex modifications to existing circuits.

24 Claims, 5 Drawing Sheets

METHOD AND APPARATUS FOR PERFORMING BI-ENDIAN BYTE AND SHORT ACCESSES IN A SINGLE-ENDIAN MICROPROCESSOR

BACKGROUND OF THE INVENTION

1. Field of the Invention

The present invention relates generally to the field of microprocessors and more specifically to single-endian microprocessors that are compatible with bi-endian systems.

2. Art Background

Byte ordering determines how data is read from or written to memory and buses and ultimately how data is stored in the memory. The two byte ordering types are referred to as little endian and big endian. Consider a word having bytes A, B, C, and D where A is the most significant byte, B is the next most significant byte, C is the third most significant byte, and D is the least significant byte. Little endian systems store words in which the least significant byte is at the lowest address in memory. If a little endian ordered word is stored at 1000H, for example, D is stored at 1000H, C is stored at 1001H, B is stored at 1002H, and A is stored at 1003H, i.e. ABCD. A big endian ordered word stores the least significant byte at the highest byte address in memory. Therefore, if a big endian word is stored at 1000H, A is stored at 1000H, B is stored at 1001H, C is stored at 1002H, and D is stored at 1003H, i.e. DCBA.

Typically, a processor will operate in either a little endian or big endian mode and the bus attached to the processor operates in the same mode. Although some processors can operate either in the big endian mode or little endian mode, most processors typically operate in one mode and perform, as necessary, a translation of data received from a memory or other external devices prior to use by the processor. For example, processors manufactured by Intel Corporation use little endian format internally. Therefore, the processor performs operations in little endian format and likewise the internal bus which connects the processor is also little endian. Translations are performed prior to use by the processor, for example at the bus controller, so that the information is in the proper format prior to receipt by the processor.

The typical translation converts big endian ordered data to little endian ordered data, or vice versa, by switching the order of the bytes. For example, in processors manufactured by Intel Corporation, a big endian ordered word DCBA received by the microprocessor is converted to little endian ABCD by the bus controller before being placed on the internal bus. Likewise, when the processor stores little endian data ABCD to a big endian external memory, the bus controller converts the data to DCBA before storing. Thus, the translation is performed during both load and store accesses to big endian ordered memory locations.

However, this byte ordering translation does not correctly handle byte and short accesses to big endian ordered memory where a processor has a little endian data cache or where a little endian processor promotes cacheable byte or short (two bytes) accesses to word accesses. For example, big endian ordered data DCBA is stored at memory location 1000H. A copy of the big endian data is stored at 1000H in the data cache unit in little endian format as ABCD. Suppose that the processor requests byte data D at 1003H. In a first case, the access "hits" the data cache. But data A at 1003H in the data cache is not a copy of data D at 1003H in external memory. Therefore, the data cache returns incorrect data to the processor. Effectively the same result occurs in a second case when the byte access does not hit the data cache. In that case the byte access to 1003H is promoted to a word access to 1000H by the bus controller. The bus controller returns, after byte ordering translation, ABCD to the internal bus. Again, data A returned to the internal bus at the position corresponding to 1003H is not the same as data D at 1003H in external memory.

Therefore, a method and apparatus for performing bi-endian byte and short accesses in a single-endian microprocessor is needed.

SUMMARY OF THE INVENTION

The present invention is drawn to an apparatus, system, and method for performing bi-endian byte and short accesses in a single-endian microprocessor. The microprocessor of the present invention comprises a core means, a bus controller means, a converting means and a pointer means.

The core means issues instructions, including instructions to load sub-word and word data from a memory external to the microprocessor, on a local bus. The bus controller means loads sub-word and word data from the external memory in response to the load instructions issued by the core means. The bus controller means places the loaded data on the local bus. The core means receives the loaded data from the local bus. The bus controller means selectively promotes sub-word loads of sub-word data to word loads of word data. The word data loaded by a promoted sub-word load includes the sub-word data requested by the sub-word load.

The microprocessor only handles data of a first endian ordering. The external memory stores data of the first endian ordering in a first region and data of a second endian ordering in a second region.

The converting means converts data loaded from the second region of the external memory to the first endian ordering before the bus controller means places the loaded data on the local bus.

The pointer means points to sub-word data within word data placed on the local bus by the bus controller means when the bus controller means promotes a sub-word load of sub-word data to a word load of a word data. The pointer means thereby allows the core means to receive the sub-word data from the local bus The pointer means points to the first sub-word data independently of whether the word data is loaded from the first region of the external memory or the second region of the external memory.

One object of the present invention is to allow the data cache of a single-endian microprocessor to correctly handle sub-word memory accesses to bi-endian external memory. For this end the present invention provides an apparatus and method for pointing to the appropriate corresponding location in the data cache independently of whether the microprocessor accesses data in big endian or little endian ordered regions of the external memory.

Another object of the present invention is to allow a bus controller that promotes sub-word loads to word loads to point the processor core to the correct sub-word data returned as part of the word data on a local bus. For this end the present invention provides an apparatus and method for pointing to the appropriate sub-word data within the promoted word data returned to the local bus independently of whether the bus controller loads data from big endian or little endian ordered regions of the external memory.

Another object of the present invention is to improve the flexibility of a computer system by providing a computer system that uses a single endian microprocessor capable of accessing bi-endian external memory.

Yet another object of the present invention is to provide bi-endian compatibility in a microprocessor without undue or overly complex modifications to existing bus controller or data cache circuits.

DETAILED DESCRIPTION OF THE INVENTION

A method and apparatus for performing bi-endian byte and short accesses in a single-endian microprocessor is described. In the following description, numerous specific details are set forth in order to provide a thorough understanding of the present invention. It will be apparent, however, to one skilled in the art that the present invention may be practiced without these specific details. In other instances, well-known methods and circuits are shown in block diagram form in order not to obscure the present invention unnecessarily. It is understood that the present invention is comprised of transistor circuits that are readily manufacturable using well known CMOS (complimentary metal-oxide semiconductor) technology, or other equivalent semiconductor manufacturing process.

OVERALL DESIGN OF THE PREFERRED EMBODIMENT OF THE PRESENT INVENTION

Figure 1:
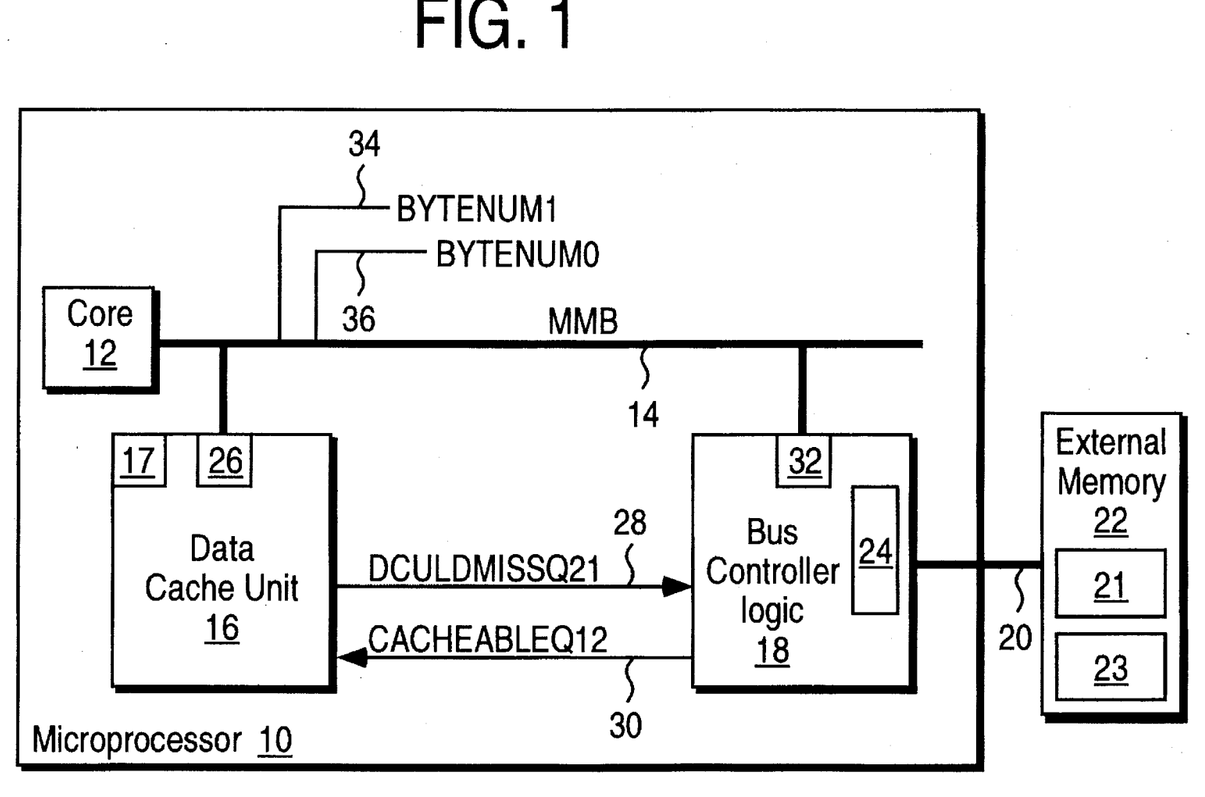
FIG. 1 is a block diagram of the preferred embodiment of the microprocessor of the present invention.

FIG. 1 illustrates a block diagram of the preferred embodiment of the present invention. The microprocessor 10 of the present invention includes a processor core 12, a data cache unit (DCU) 16, and a bus controller logic (BCL) 18, all coupled to a memory-side machine bus (MMB) 14. The memory-side machine bus 14 allows a common data transfer and control path between the units that are connected to it. The processor core 12 issues instructions on the memory-side machine bus 14 and processes instructions and data. The instructions issued by the processor core 12 include instructions for accessing data in an external memory 22. For example, a LOAD instruction is for loading or retrieving data from external memory and a STORE instruction is for storing data in external memory. The memory access instructions load and store byte, short, and word data. (A word consists of four bytes; a short consists of two bytes.) The external memory 22 stores little endian ordered data in a first memory region 21 and big endian ordered data in a second memory region 23. The bus controller logic 18 and the external memory 22 are coupled to a system bus 20. The system bus 20 is used to transfer data between the microprocessor 10 and external devices such as external memory 22. The bus controller logic 18 controls data transfers on the system bus 20. A memory region table in the bus controller logic 18 divides the external memory 22 into regions. Each entry in the table identifies characteristics of a region of external memory. For example, some characteristics determined by the memory region table are whether a region is little endian or big endian, and whether a region is cacheable. The data cache unit 16 stores copies of data that the bus controller logic 18 retrieves from the external memory 22 for subsequent use by the processor core 12.

The data cache unit 16 receives a CACHEABLE12 30 signal from the bus controller logic 18. The CACHEABLE12 30 signal indicates whether an access by the processor core 12 is to a cacheable region of the external memory 22. The CACHEABLE12 30 signal causes the data cache unit 16 to handle only cacheable data accesses.

The bus controller logic 18 receives a DCULDMISSQ21 28 signal from the data cache unit 16. The DCULDMISSQ21 28 signal indicates whether the data cache unit 16 stores a copy of the cacheable data requested by the processor core 12. The DCULDMISSQ21 28 signal causes the bus controller logic 18 to retrieve cacheable data from the external memory 22 only when a copy of the requested data is not stored in the data cache unit 16.

The microprocessor 10 of the present invention is entirely little endian. The processor core 12 performs operations in little endian format, the memory-side machine bus 14 is little endian, and the data cache unit 16 stores and returns copy data in little endian format. A byte converter 24 performs byte ordering translation when the bus controller logic 18 transfers word and short data between the little endian microprocessor 10 and a big endian region of the external memory 22. For example, when the processor core 12 stores a little endian word ABCD to a big endian ordered region of the external memory 22, the byte converter 24 converts the word to DCBA before the bus controller logic 18 places it on the system bus 20 to be stored in the external memory 22. Likewise, when the processor core 12 loads a big endian word DCBA from a big endian ordered region of the external memory 22, the byte converter 24 converts the word to ABCD before the bus controller logic 18 returns it to the processor core 12 on the memory-side machine bus 14. The translation is similar for short STOREs and for LOADs that are not promoted to word accesses. For example, when the processor core 12 stores a little endian short data EF to a big endian ordered region of the external memory 22, the byte converter 24 converts the short data to FE before the bus controller logic 18 places it on the system bus 20. Likewise, when the processor core 12 loads a big endian short FE from a big endian ordered region of the external memory 22, the byte converter 24 converts the short data to EF before the bus controller logic 18 returns it on the memory-side machine bus 14.

As will be further explained, the microprocessor 10 of the present invention selectively promotes short or byte LOADs to word LOADs. The BYTENUM1 34 and BYTENUM0 36 signals are control signals carried by the memory-side machine bus 14 that indicate to the processor core 12 the position of sub-word data within a word returning to the core 12 on the memory-side machine bus 14. Each unit coupled to the memory-side machine bus 14 can drive the BYTENUM1 34 and BYTENUM0 36 signals when returning data to the processor core 12.

The data cache unit 16 is a 1 kilobyte, direct-mapped, write through, little endian cache. The cache memory array 17 is organized in 64 lines consisting of 16 bytes each. Each line comprises four words of four bytes each, each word having a valid bit to indicate whether the corresponding word is valid. A tag array of 64 entries corresponds to the 64 lines in the data cache unit 16. The data cache unit 16 always returns word data when a LOAD "hits" the data cache. Therefore, when a sub-word LOAD "hits" the data cache unit 16, the BYTENUM1 34 and BYTENUM0 36 signals must point to the correct sub-word data within the word returned to the memory-side machine bus 14. The BYTENUM1 34 and BYTENUM0 36 signals are also used locally within the data cache unit 16 during a cacheable sub-word STORE as the two least significant bits (LSBs) of the data address to address the cache memory array 17 and, thereby, store the sub-word data in the correct location in the cache memory array 17.

A DCU pointer unit 26 drives the BYTENUM1 34 and BYTENUM0 36 signals during a data cache access to allow the data cache unit 16 to correctly handle sub-word (byte or short) LOADs and STOREs by the processor core 12 to big endian regions of the external memory 22. Normally, BYTENUM1 34 and BYTENUM0 36 signals are the same as the two least significant bits (LSBs) of the address, i.e. A1 and A0. However, for big endian short or byte accesses the values are different. For example, big endian ordered data DCBA is stored in the external memory 22 at 1000H. A copy of the big endian data is stored at 1000H in the data cache unit 16 in little endian format as ABCD. Suppose that the processor core 12 issues a LOAD instruction requesting the byte D that is stored at 1003H in the external memory 22. The data cache unit 16 receives the address 1003H from the processor core 12 via the memory-side machine bus 14. The data cache unit 16 returns the word ABCD containing byte D to the memory-side machine bus 14. Because the access is a byte access from big endian ordered memory, the DCU pointer unit 26 drives the BYTENUM1 34 and BYTENUM0 36 signals to A1# and A0#, respectively, (where A1 and A0 are the two least significant bits (LSBs) of the address and A1# means the complement of A1 and A0# means the complement of A0) such that the processor core 12 receives the data D corresponding to location 1000H instead of the data A corresponding to location 1003H.

The DCU pointer unit 26 also adjusts for short accesses to big endian memory. For example, big endian ordered data HGFE is stored in the external memory 22 at 2000H. A copy of the big endian data is stored at 2000H in the data cache unit 16 in little endian format as EFGH. Suppose that the processor core 12 issues a STORE instruction to store short AB to 2000H, a cacheable location in the external memory 22. The byte converter 24 reorders the short to BA before the bus controller logic 18 stores the short at location 2000H in the external memory 22. The result is that word data HGBA now resides at 2000H in the external memory 22. In addition, the data cache unit 16 will store a copy of the short AB in order to maintain an accurate copy of the external dam. Because the access is a short access to big endian ordered memory, the DCUM pointer unit 26 drives the BYTENUM1 34 and BYTENUM0 36 signals to A1# and A0, respectively. The data cache unit 16 uses the BYTENUM1 34 and BYTENUM0 36 signals locally as the two LSBs of the address that addresses the cache memory array 17 such that the data cache unit 16 stores short data AB at location 2002H instead of the 2000H. Therefore, the data cache unit 16 stores a correct copy data ABGH at 2000H of the big endian data HGBA at 2000H in the external memory 22.

The bus controller logic 18 promotes all cacheable byte and short LOADs that "miss" the data cache unit 16 to word accesses. (This is done because the valid bits in the cache memory array 17 of the data cache unit 16 are word granularity.) This is done by promoting the sub-word LOAD to word and treating the two least significant bits of the address, A1 and A0, as zeros. For example, a cacheable byte LOAD from address 1003H, or binary 0001 0000 0000 0011, that "misses" data cache unit 16 is promoted to a word access and the two least significant bits are treated as zeros, making the effective address 1000H, or binary 0001 0000 0000 0000. Therefore, the bus controller logic 18 will return the word data at 1000H in external memory.

A BCL pointer unit 32 allows the bus controller logic 18 to correctly handle sub-word LOADs that are promoted to word accesses. As already discussed, the bus controller logic 18 promotes all sub-word cacheable LOADs that "miss" the data cache unit 16 to word accesses. The BCL pointer unit 32 drives the BYTENUM1 34 and BYTENUM0 36 signals to point the processor core 12 to point to the correct sub-word data within the word data returned to the memory-side machine bus 14 by the bus controller logic 18. The result of using word promotion and the BYTENUM1 pointer is that the processor core 12 receives the byte or short data that it originally requested and the data cache unit 16 receives a full word to update the data cache. (Using a full word to update the data cache unit 16 is desirable because of the word granularity of the valid bits in the cache memory array 17.) Normally, BYTENUM1 34 and BYTENUM0 36 signals are the same as the two least significant bits (LSBs) of the address, A1 and A0, respectively. However, for big endian short or byte accesses that are promoted to word accesses the values are different. For example, big endian ordered data DCBA is stored at memory location 1000H. Suppose that the processor core 12 issues a LOAD instruction requesting the byte B stored at 1001H in the external memory 22 and no copy of the data is stored in the data cache unit 16. The bus controller logic 18 promotes the byte LOAD to a word LOAD and retrieves the word DCBA from 1000H in the external memory 22. The byte converter 24 reorders the word to little endian format ABCD before the bus controller logic 18 returns the word to the memory-side machine bus 14. The BCL pointer unit 32 receives the two LSBs of the address 1001H and drives the BYTENUM1 34 and BYTENUM0 36 signals to A1# and A0#, respectively, such that the processor core 12 is pointed to data B corresponding to location 1002H instead of data C corresponding to location 1001H. Therefore, the processor core 12 correctly receives data B instead of data C. The BCL pointer unit 32 also adjusts the BYTENUM pointer values for word-promoted short LOADs from big endian external memory by driving the BYTENUM1 and BYTENUM0 signals to A1# and A0, respectively.

Because the microprocessor 10 of the present invention is little endian and the external memory 22 is both little endian and big endian, the DCU pointer unit 26 and the BCL pointer unit 32 must account for both types of ordering, i.e., they must allow the data cache unit 16 and the bus controller logic 18 to correctly handle byte, short, word, and multiple word accesses by the processor core 12 to little endian or big endian ordered memory. To accomplish this, the DCU pointer unit 26 and the BCL pointer unit 32 adjust the BYTENUM1 34 and BYTENUM0 36 pointer values in logical relation to the two LSBs of the address.

Figure 2:
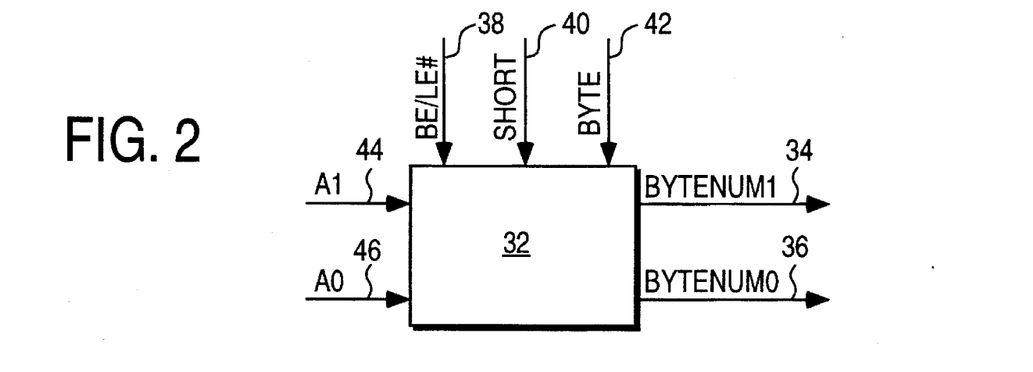
FIG. 2 is a block diagram of the DCU pointer unit 26 and the BCL pointer unit 32 of the present invention.

FIG. 2 is a block diagram of the DCU pointer unit 26 of the data cache unit 16 and the BCL pointer unit 32 of the bus controller logic 18. The DCU pointer unit 26 and the BCL pointer unit 32 are functionally equivalent. The DCU pointer unit 26 receives address bits A1 44 and A0 46, and control signals BE/LE#38, SHORT 40, and BYTE 42 as inputs from the memory-side machine bus 14 and drives output signals BYTENUM1 34 and BYTENUM0 36. The data cache unit 16 uses the BYTENUM1 34 and BYTENUM0 36 signals locally as the two LSBs for addressing the cache memory array 17 during a sub-word STORE and to point the processor core 12 to the proper sub-word data on the memory-side machine bus 14 after a sub-word LOAD "hit." The BCL pointer unit 32 also receives address bits A1 44 and A0 46, and control signals BE/LE# 38, SHORT 40, and BYTE 42 as inputs from the memory-side machine bus 14 and drives output signals BYTENUM1 34 and BYTENUM0 36 to point the processor core 12 to the proper sub-word data on the memory-side machine bus 14 after a word-promoted LOAD. The BE/LE# 38 signal is generated by the bus controller logic 18 from the region table and indicates an access to big endian ordered memory when high and little endian ordered memory when low. The SHORT 40 signal is generated by the core 12 and indicates a short type access when high. The BYTE 42 signal is generated by the core 12 and indicates a byte type access when high. Both the SHORT 40 and BYTE 42 signals being low together indicates a word access. The DCU pointer unit 26 and the BCL pointer unit 32 drive the output signals BYTENUM1 34, and BYTENUM0 36 in logical relation to the A1 44 and A0 46 address bits as defined in Tables I and II.

TABLE I

Logical relationships between BYTENUM1, BYTENUM0 and A1, A0 for DCU pointer unit 26.

| TYPE OF ACCESS | BYTENUM VALUES |
| --- | --- |
| All cacheable word accesses and all cacheable little endian accesses. | BYTENUM1 = A1<br>BYTENUM0 = A0 |
| All cacheable byte, big endian accesses. | BYTENUM1 = A1#<br>BYTENUM0 = A0# |
| All cacheable short, big endian accesses. | BYTENUM1 = A1#<br>BYTENUM0 = A0 |

TABLE II

Logical relationship between BYTENUM1, BYTENUM0 and A1, A0 for the BCL pointer generator 32.

| TYPE OF ACCESS | BYTENUM VALUES |
| --- | --- |
| All word accesses and all little endian accesses. | BYTENUM1 = A1<br>BYTENUM0 = A0 |
| All byte, big endian cacheable LOADs that are promoted to word accesses. | BYTENUM1 = A1#<br>BYTENUM0 = A0# |
| All short, big endian cacheable LOADs that are promoted to word accesses. | BYTENUM1 = A1#<br>BYTENUM0 = A0 |

The logical relationships of Tables I and II are readily implemented in the DCU pointer unit 26 and the BCL pointer unit 32 using combinational logic.

The following four examples illustrate the present invention. For each big endian access example assume that big endian ordered data DCBA is stored in the external memory 22 at location 1000H and that the data cache unit 16 stores a corresponding little endian copy ABCD at 1000H. For each little endian access example assume that little endian ordered data EFGH is stored in the external memory 22 at location 2000H and that the data cache unit 16 stores a corresponding little endian copy EFGH at 2000H.

EXAMPLE 1

This example is for a cacheable LOAD of byte data E from 2003H, a little endian ordered region of the external memory 22. The processor core 12 issues the LOAD instruction on the memory-side machine bus 14. Assume first that the access "hits" the data cache unit 16. The data cache unit 16 returns word EFGH that contains byte E from location 2000H. The DCU pointer unit 26 drives the BYTENUM1 34 and BYTENUM0 signals to 1 and 1, respectively, pointing to byte3 (of bytes 3, 2, 1, and 0) of word EFGH on the memory-side machine bus 14. The processor core 12 then receives byte E from the memory-side machine bus 14. Assume now that the access did not "hit" the data cache. In this case, the bus controller logic 18 promotes the cacheable byte LOAD to a word access and treats the two least significant address bits, A1 and A0, as zeros. The bus controller logic 18, therefore, retrieves the word EFGH from location 2000H of the external memory 22. Since the retrieved data is little endian ordered, the byte converter 24 performs no conversion and the bus controller logic 18 returns the word EFGH to the memoryside machine bus 14. The BCL pointer unit 32 drives the BYTENUM1 36 and BYTENUM0 34 signal to 1 and 1, respectively, pointing to byte3 of the word EFGH on the memory-side machine bus 14. Again, the processor core 12 correctly receives byte E.

EXAMPLE 2

This example is for a cacheable LOAD of byte data D from 1003H, a big endian ordered region of the external memory 22. The processor core 12 issues the LOAD instruction on the memory-side machine bus 14. Assume first that the access "hits" the data cache unit 16. The data cache unit 16 returns word ABCD that contains byte D from location 1000H. The DCU pointer unit 26 drives the BYTENUM1 34 and BYTENUM0 36 signals to 0 and 0, respectively, pointing to byte0 of word ABCD on the memory-side machine bus 14. The processor core 12 then receives byte D from the memory-side machine bus 14. Assume now that the access did not "hit" the data cache. In this case, the bus controller logic 18 promotes the cacheable byte LOAD to a word access and treats the two least significant address bits, A1 and A0, as zeros. The bus controller logic 18, therefore, retrieves the word DCBA from location 1000H of the external memory 22. Since the retrieved data is big endian ordered, the byte converter 24 converts DCBA to ABCD and the bus controller logic 18 returns the word ABCD to the memory-side machine bus 14. The BCL pointer unit 32 drives the BYTENUM1 36 and BYTENUM0 34 signal to 0 and 0, respectively, pointing to byte0 of the word ABCD on the memory-side machine bus 14. Again, the processor core 12 correctly receives byte D.

EXAMPLE 3

This example is for a cacheable LOAD of short data BA from 1000H, a big endian ordered region of the external memory 22. The processor core 12 issues the LOAD instruction on the memory-side machine bus 14. Assume first that the access "hits" the data cache unit 16. The data cache unit 16 returns word ABCD that contains short AB from location 1000H. The DCU pointer unit 26 drives the BYTENUM1 34 and BYTENUM0 36 signals to 1 and 0, respectively, pointing to short2 (of shorts2 and 0) of word ABCD on the memory-side machine bus 14. The processor core 12 then receives short AB from the memory-side machine bus 14. Assume now that the access did not "hit" the data cache. In this case, the bus controller logic 18 promotes the cacheable short LOAD to a word access and treats the two least significant address bits, A1 and A0, as zeros. The bus controller logic 18, therefore, retrieves the word DCBA from location 1000H of the external memory 22. Since the retrieved data is big endian ordered, the byte converter 24 converts DCBA to ABCD and the bus controller logic 18 returns the word ABCD to the memory-side machine bus 14. The BCL pointer unit 32 drives the BYTENUM1 36 and BYTENUM0 34 signal to 1 and 0, respectively, pointing to short2 of the word ABCD on the memory-side machine bus 14. Again, the processor core 12 correctly receives short AB.

EXAMPLE 4

This example is for a cacheable STORE of byte data K to location 1000H, a big endian ordered region of the external memory 22. The processor core 12 issues the STORE instruction on the memory-side machine bus 14. The bus controller logic 18 stores byte K to location 1000H in the external memory 22 resulting in word data DCBK residing at 1000H in the external memory 22. In addition, the data cache unit 16 will store a copy of the data. Because the access is a byte access to big endian ordered memory, the DCU pointer unit 26 drives the BYTENUM1 34 and BYTENUM0 36 signals to 1 and 1, respectively. The data cache unit 16 uses the BYTENUM1 34 and BYTENUM0 36 signals locally as the two LSBs of the address that addresses the cache memory array 17 to cause the data cache unit 16 to store byte K at location 1003H instead of the 1000H. Therefore, the data cache unit 16 stores a correct copy data KBCD at 1000H of the big endian data DCBK at 1000H in the external memory 22.

The present invention is also readily implemented in a big endian microprocessor that transfers data between bi-endian external devices.

OPERATION OF THE PREFERRED EMBODIMENT OF THE PRESENT INVENTION

Figure 3:
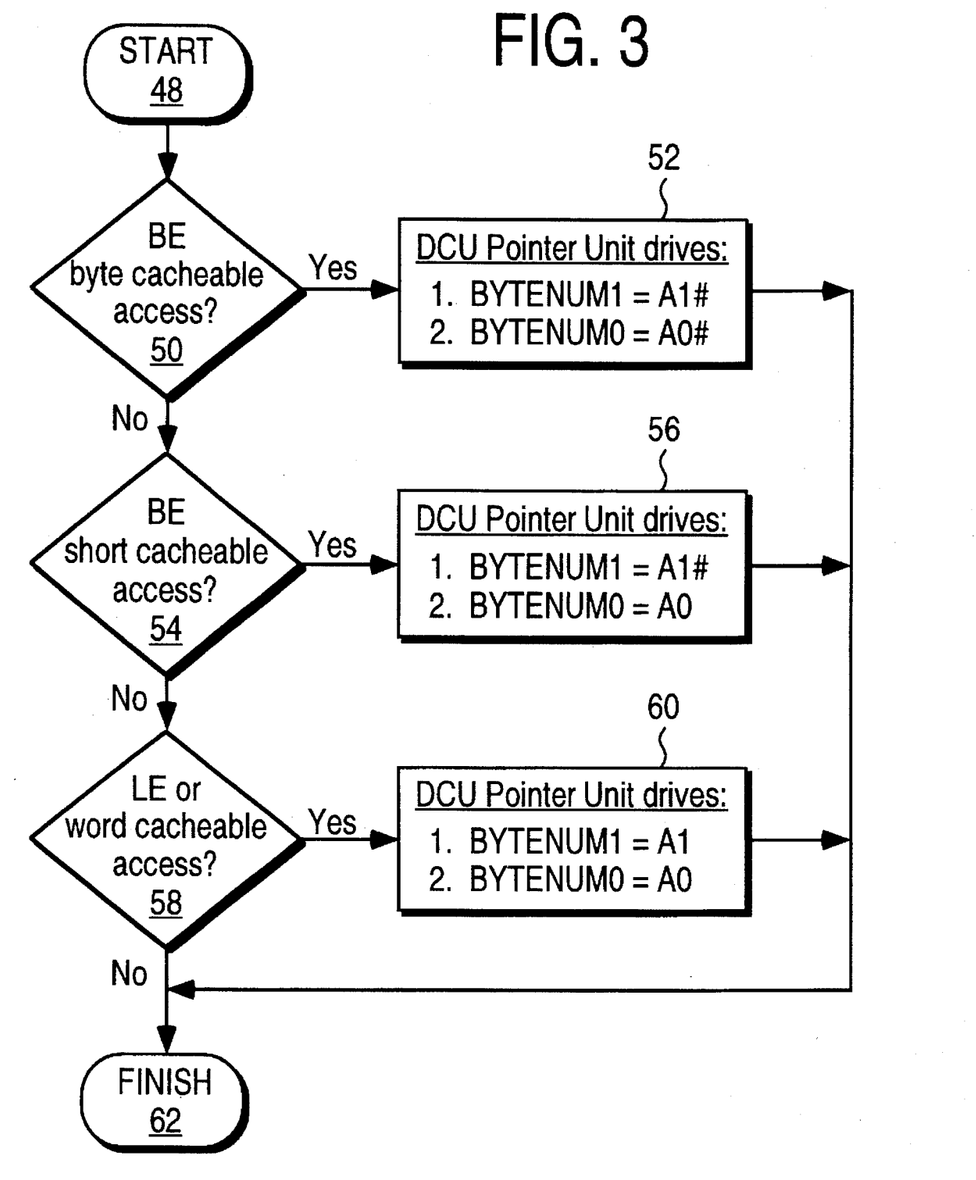
FIG. 3 is a flowchart of the method of the preferred embodiment of the present invention as embodied in the data cache unit 16.
Figure 4:
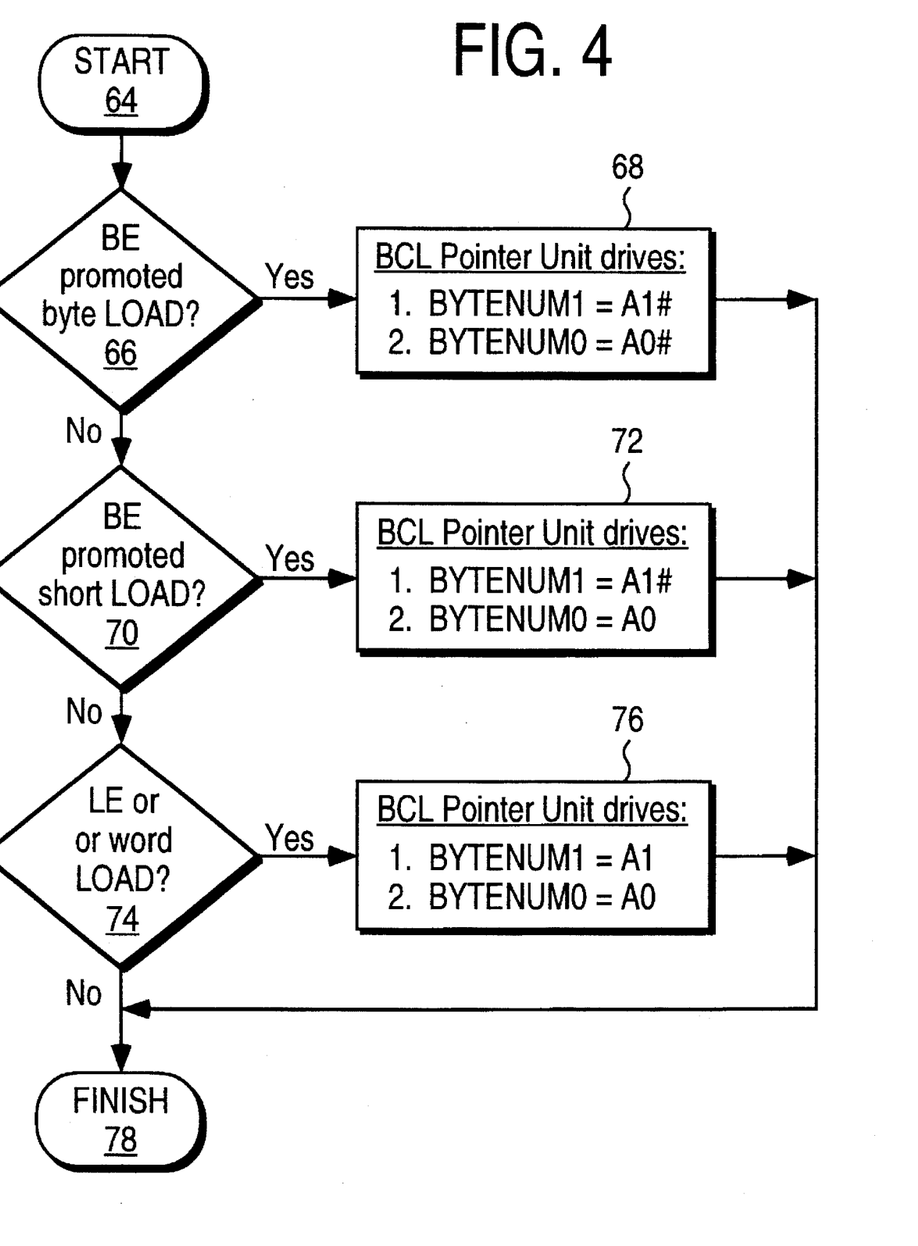
FIG. 4 is a flowchart of the method of the preferred embodiment of the present invention as embodied in the bus controller logic 18.

The major functions of the preferred embodiment of the present invention operate according to the flow diagrams illustrated in FIGS. 3 and 4. In its overall operation, the present invention acts to: 1) allow correct handling of sub-word accesses by the data cache unit 16 when the processor core 12 accesses cacheable big endian ordered memory, 2) allow correct handling of big endian LOADS which are promoted to word LOADs by the bus controller logic 18 when the processor core 12 accesses cacheable big endian ordered memory, and 3) maintain correct handling of data by the data cache unit 16 and the bus controller logic 18 when the processor core 12 performs word accesses or accesses to little endian ordered memory. Therefore, the present invention allows a single-endian processor with a little endian data cache and a bus controller that selectively promotes sub-word LOADs to word LOADs to correctly perform bi-endian memory accesses.

Referring now to FIG. 3, the method of the present invention as embodied in the data cache unit 16 begins at step 48 when the processor core 12 issues an instruction on the memory-side machine bus 14 to perform a memory access.

In step 50, the processor core 12 specifies if the access is a byte access and the bus controller logic 18 determines if the access is an access to a cacheable, big endian ordered region of the external memory 22. (The processor core 12 can specify access types of byte, short, word, long, triple, and quad.) If the access is a byte access to a cacheable, big endian region of memory, then in step 52 the DCU pointer unit 26 drives the BYTENUM1 34 and BYTENUM0 36 signals to A1# and A0#, respectively; otherwise the method continues in step 54. For a cacheable STORE instruction, the data cache unit 16 uses the BYTENUM pointers as the two LSBs in addressing the cache memory array 17. For a cacheable LOAD instruction that "hits" the data cache unit 16, the data cache unit returns a word to the memory-side machine bus 14. The BYTENUM signals point the processor core 12 to the proper byte on the memory-side machine bus.

In step 54, the processor core 12 specifies if the access is a short access and the bus controller logic 18 determines if the access is an access to a cacheable, big endian ordered region of the external memory 22. If the access is a short access to a cacheable, big endian region of memory, then in step 56 the DCU pointer unit 26 drives the BYTENUM1 34 and BYTENUM0 36 signals to A1# and A0, respectively; otherwise the method continues in step 58.

In step 58, the processor core 12 specifies if the access is a word access and the bus controller logic 18 determines if the access is a cacheable access and if the access is to a little endian ordered region of the external memory 22. If the access is a cacheable word access or a cacheable access to a little endian region of memory, then in step 60 the DCU pointer unit 26 drives the BYTENUM1 34 and BYTENUM0 36 signals to A1 and A0, respectively; otherwise the method continues in step 62. These are the default values for BYTENUM1 34 and BYTENUM0 36.

Steps 52, 56, and 60 all proceed to step 62 where the method finishes by completing the memory access.

Referring now to FIG. 4, the method of the present invention as embodied in the bus controller logic 18 begins at step 64 when the processor core 12 issues an instruction on the memory-side machine bus 14 to perform a cacheable LOAD.

In step 66, the processor core 12 specifies if the access is a byte LOAD and the bus controller logic 18 determines if the LOAD is promoted to a word LOAD and if the LOAD is from a big endian ordered region of the external memory 22. In the preferred embodiment of the present invention the bus controller logic 18 promotes all cacheable sub-word LOADs that "miss" the data cache unit 16 to word LOADs. If the memory access is a promotable byte LOAD from a big endian ordered region of memory, then in step 68 the BCL pointer unit 32 drives the BYTENUM1 34 and BYTENUM0 36 signals to A1# and A0#, respectively; otherwise the method continues with step 70. For a word-promoted LOAD, the BYTENUM signals point the processor core 12 to the proper byte within the word data returned to the memory-side machine bus 14.

In step 70, the processor core 12 specifies if the access is a short LOAD and the bus controller logic 18 determines if the LOAD is promoted to a word LOAD and if the LOAD is from a big endian ordered region of the external memory 22. If the memory access is a promotable short LOAD from a big endian ordered region of memory, then in step 72 the BCL pointer unit 32 drives the BYTENUM1 34 and BYTENUM0 36 signals to A1# and A0, respectively; otherwise the method continues with step 74.

In step 74, the processor core 12 specifies if the access is a word LOAD and the bus controller logic 18 determines if the LOAD is from a little endian ordered region of the external memory 22. If the memory access is a word LOAD or a LOAD from a little endian ordered region of memory, then in step 76 the BCL pointer unit 32 drives the BYTE- NUM1 34 and BYTENUM0 36 signals to A1 and A0, respectively; otherwise the method continues with step 74. These are the default values for BYTENUM1 34 and BYTENUM0 36.

Steps 68, 72, and 76 all proceed to step 76 where the method finishes by completing the memory access.

OVERALL SYSTEM AND ENVIRONMENT OF THE PRESENT INVENTION

Figure 5:
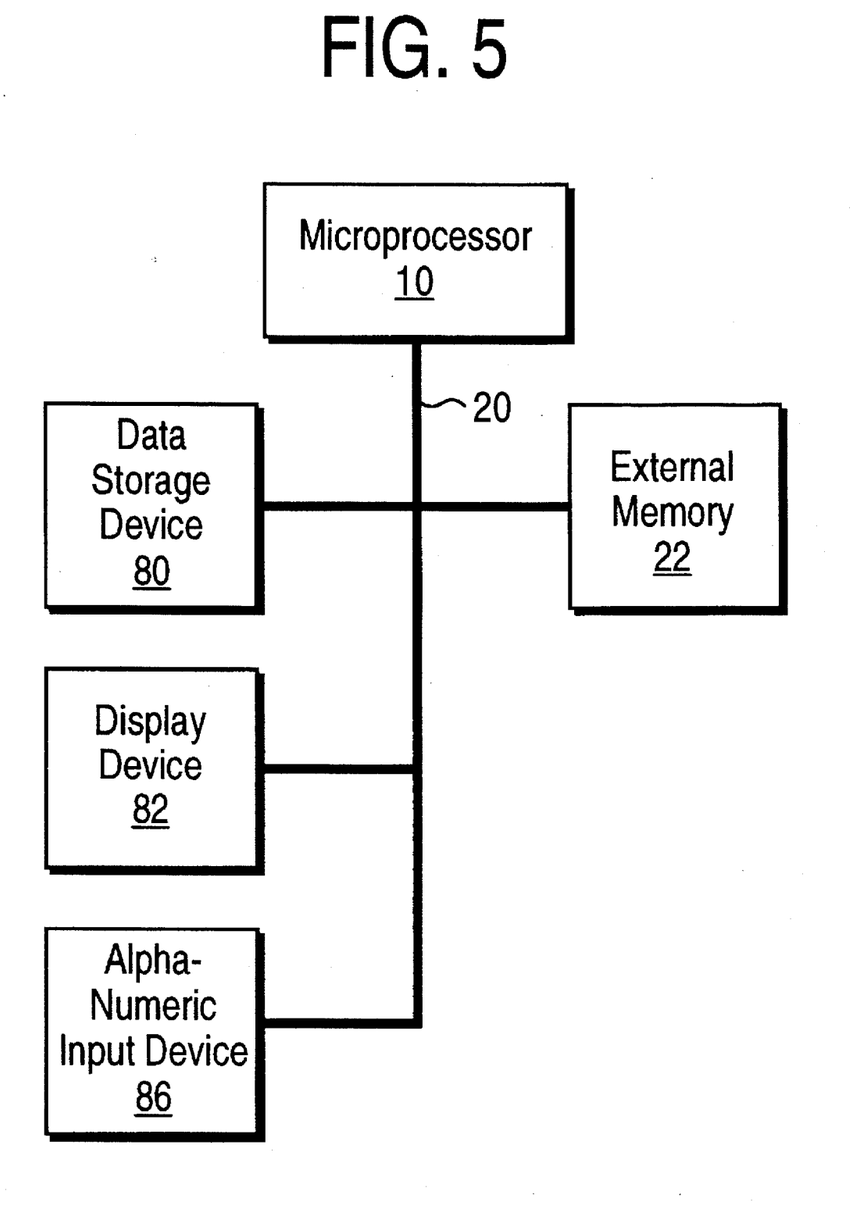
FIG. 5 is a block diagram of one overall system embodiment of the present invention.

The overall environment, or system, in which the preferred embodiment operates is now described. In general, the preferred the preferred embodiment of the present invention is used in digital computer systems comprising, as illustrated in FIG. 5, a system bus 20 for communicating information between the elements of the system, a microprocessor 10 coupled to system bus 20 for processing information and instructions, external memory 22 coupled to system bus 20 where the external memory can be either random access memory for storing information and instructions for the microprocessor or read only memory for storing static information and instructions for microprocessor 10, a data storage device 62 such as a magnetic disk and disk drive coupled with system bus 20 for storing program information and instructions, a display device 64 coupled to the system bus 20 for displaying information to the computer user, and an alphanumeric input device 66 coupled to the system bus 20 for communicating information and command selections to microprocessor 10. It is understood that some environments of the present invention may contain all or merely a portion of the above components.

Thus, a method and apparatus for performing bi-endian byte and short accesses in a single-endian microprocessor has been described.

What is claimed is:

1. A microprocessor for accessing an external memory containing first endian ordered data and second endian ordered data, said microprocessor comprising:

a local bus;

a bus controller coupled to said local bus and having an interface for coupling to said external memory, said bus controller comprising:

loading means for loading sub-word data and word data from said external memory onto said local bus, said loading means promoting loads of sub-word data to loads of word data, the word data including the sub-word data;

converting means coupled to said loading means, said converting means for converting first endian ordered data loaded from said external memory to second endian ordered data; and pointer means coupled to said local bus, said pointer means for pointing to the sub-word data within the word data placed on said local bus.

2. The microprocessor of claim 1 wherein the sub-word data is either byte or short data.

3. The microprocessor of claim 1 wherein the first endian ordered data is big endian ordered data and the second endian ordered data is little endian ordered data.

4. The microprocessor of claim 1 wherein said pointer means drives first and second pointer signals that point to the first sub-word data within the word data placed on said local bus, the first and second pointer signals being based on the least significant and next least significant bits, respectively, of an address of the sub-word data in said external memory.

5. The microprocessor of claim 4 wherein, if the sub-word data is first endian ordered short data, the first and second pointer signals are based on the least significant and complement of the next least significant bits of the address of the short data in said external memory, and wherein, if the sub-word data is byte data and the word data is first endian ordered, the first and second pointer signals are based on the complement of the least significant and next least significant bits of the address of the byte data in said external memory.

6. A microprocessor for accessing an external memory containing first endian ordered data and second endian ordered data, said microprocessor comprising:

a local bus;

a bus controller coupled to said local bus and including an interface for coupling to said external memory, said bus controller being configured to load sub-word data and word data from said external memory controller being further configured to promote loads of sub-word data to loads of word data, the word data including the sub-word data;

said bus controller further including:

a converter unit configured to convert first endian ordered data loaded from said external memory to second endian ordered data; and pointer unit configured to point to the sub-word data within the word data placed on said local bus.

7. The microprocessor of claim 6 wherein the sub-word data is either byte or short data.

8. The microprocessor of claim 6 wherein the first endian ordered data is big endian ordered data and the second endian ordered data is little endian ordered data.

9. The microprocessor of claim 6 wherein said pointer unit drives first and second pointer signals that point to the first sub-word data within the word data placed on said local bus, the first and second pointer signals being based on the least significant and next least significant bits, respectively, of an address of the sub-word data in said external memory.

10. The microprocessor of claim 9 wherein, if the word data is first endian ordered, at least one of the first and second pointer signals is complemented.

11. A computer system comprising:

a system bus;

an external memory coupled to said system bus; and a microprocessor coupled to said system bus, said microprocessor comprising:

a local bus;

a core coupled to said local bus; and a bus controller coupled to said local bus and to said system bus, said bus controller being configured to:

receive via said local bus an instruction from said core to perform a load of a sub-word datum from said external memory;

promote the load of the sub-word datum to a load of a word datum, the word datum including the sub-word datum:

convert the word datum from a first endian ordering to a second endian ordering;

place the word datum on said local bus; and set the state of one or more pointer signals in said local bus, the one or more pointer signals pointing to the sub-word datum within the word-datum placed on said local bus.

12. The computer system of claim 11 wherein the sub-word data is either byte or short data.

13. The computer system of claim 11 wherein said external memory includes a first region containing data of the first endian ordering and a second region containing data of the second endian ordering and wherein said bus controller is further configured to convert the word datum to a second endian ordering only if the word datum is obtained from first region of said external memory.

14. The computer system of claim 12 wherein the one or more pointer signals represent least significant address bits of the sub-word data in said external memory.

15. The computer system of claim 14 wherein at least one of said one or more pointer signals is complemented if the word datum is of a first endian ordering.

16. A bus controller comprising:

a first bus interface and a second bus interface;

loading logic configured to load sub-word data from the first bus interface onto the second bus interface, said loading logic further configured to promote a load of a sub-word data to a load of a word data, the word data loaded including the sub-word data;

a converting unit configured to convert data loaded from the first bus interface from a first endian ordering to a second endian ordering before said loading logic loads the data onto the second bus interface;

a pointer unit configured to point to the sub-word data within the word data placed onto the second bus interface by said loading logic.

17. A microprocessor for accessing an external memory, said microprocessor comprising:

a local bus;

a core coupled to said local bus; and a bus controller coupled to said local bus and having an interface for coupling to said external memory;

said bus controller being configured to:

receive via said local bus an instruction from said core to perform a load of a sub-word datum from said external memory;

promote the load of the sub-word datum to a load of a word datum, the word datum including the sub-word datum;

convert the word datum from a first endian ordering to a second endian ordering;

place the word datum on said local bus; and set the state of one or more pointer signals in said local bus, the one or more pointer signals pointing to the sub-word datum within the word-datum placed on said local bus.

18. The microprocessor of claim 17 wherein the sub-word data is either byte or short data.

19. The microprocessor of claim 17 wherein said external memory includes a first region containing data of the first endian ordering and a second region containing data of the second endian ordering and wherein said bus controller is further configured to convert the word datum to a second endian ordering only if the word datum is obtained from the first region of said external memory.

20. The microprocessor of claim 19 wherein said bus controller includes a memory region table indicating endian ordering of the first and second regions of said external memory and wherein said bus controller is further configured to determine the endian ordering of the word datum based on the memory region table.

21. The microprocessor of claim 17 wherein said bus controller is further configured to promote the load of the sub-word datum to a load of a word datum upon determining that the sub-word datum sought was not read from a cache memory.

22. The microprocessor of claim 17 wherein said bus controller is further configured to promote the load of the sub-word datum to a load of a word datum by zeroing the two least significant bits of the address of the sub-word datum in said external memory.

23. The microprocessor of claim 17 wherein the one or more pointer signals represent least significant address bits of the sub-word data in said external memory.

24. The microprocessor of claim 23 wherein at least one of said one or more pointer signals is complemented if the word datum is of a first endian ordering.

* * * * *

UNITED STATES PATENT AND TRADEMARK OFFICE
CERTIFICATE OF CORRECTION

PATENT NO. : 5,574,923  
DATED : November 12, 1996  
INVENTOR(S) : Heeb et al.

It is certified that error appears in the above-indentified patent and that said Letters Patent is hereby corrected as shown below:

In column 4 at lines 13-14 delete "CACHEABLE12" and insert --CACHEABLEQ12--

In column 4 at line 16 delete "CACHEABLE 12" and insert --CACHEABLEQ12--

In column 4 at line 18 delete "DCLILDMISSQ21" and insert --DCULDMISSQ21--

In column 5 at line 55 delete "dam." and insert --data.--

UNITED STATES PATENT AND TRADEMARK OFFICE
CERTIFICATE OF CORRECTION

PATENT NO. : 5,574,923
DATED : November 12, 1996
INVENTOR(S) : Heeb et al

It is certified that error appears in the above-indentified patent and that said Letters Patent is hereby corrected as shown below:

In column 5 at line 57 delete "DCUM" and insert --DCU--

In column 6 at line 21 delete "BYTENUM1" and insert --BYTENUM--

In column 8 at line 10 delete "BYTENUM0" and insert --BYTENUM0 36--

In column 12 at line 17 insert --onto said loud bus, said bus-- following "memory" and prior to "controller"

Signed and Sealed this

Fourth Day of March, 1997

Attest:

Attesting Officer

BRUCE LEHMAN

Commissioner of Patents and Trademarks